(12) United States Patent
Xu et al.

(10) Patent No.: US 9,292,783 B2
(45) Date of Patent: Mar. 22, 2016

(54) RADIO FREQUENCY IDENTIFICATION TAG HAVING DIVERSION-PROOF FUNCTION AND MANUFACTURING METHOD THEREOF

(75) Inventors: Liangheng Xu, Shanghai (CN); Kai Yang, Shanghai (CN); Yun Gao, Shanghai (CN); Jin Tao, Shanghai (CN); Xiaodong He, Shanghai (CN)

(73) Assignees: SHANGHAI TECHSUN ANTICOUNTERFEITING TECHNOLOGY HOL, Shanghai (CN); SHANGHAI TECHSUN RFID TECHNOLOGY CO., LTD., Shanghai (CN)

( * ) Notice: Subject to any disclaimer, the term of this patent is extended or adjusted under 35 U.S.C. 154(b) by 63 days.

(21) Appl. No.: 14/342,531

(22) PCT Filed: Mar. 20, 2012

(86) PCT No.: PCT/CN2012/072581
§ 371 (c)(1),
(2), (4) Date: May 20, 2014

(87) PCT Pub. No.: WO2013/033984
PCT Pub. Date: Mar. 14, 2013

(65) Prior Publication Data
US 2014/0326790 A1    Nov. 6, 2014

(30) Foreign Application Priority Data
Sep. 5, 2011  (CN) .......................... 2011 1 0259552

(51) Int. Cl.
| | |
|---|---|
| *G06K 19/06* | (2006.01) |
| *G06K 19/077* | (2006.01) |
| *G06K 19/073* | (2006.01) |
| *B29C 65/48* | (2006.01) |

(52) U.S. Cl.
CPC ...... *G06K 19/07775* (2013.01); *B29C 65/4835* (2013.01); *G06K 19/0739* (2013.01); *G06K 19/07786* (2013.01)

(58) Field of Classification Search
USPC ..................... 235/492, 451; 340/572.3, 572.7
See application file for complete search history.

(56) References Cited

U.S. PATENT DOCUMENTS

| | | | |
|---|---|---|---|
| 8,282,011 B1 * | 10/2012 | Skoine et al. .................. 235/492 |
| 8,678,289 B2 * | 3/2014 | Roseman ....................... 235/488 |
| 2003/0075608 A1 * | 4/2003 | Atherton ........................ 235/492 |
| 2013/0256175 A1 * | 10/2013 | Wilkinson .................. 206/459.1 |
| 2015/0129667 A1 * | 5/2015 | Pavate et al. .................. 235/492 |

* cited by examiner

*Primary Examiner* — Ahshik Kim
(74) *Attorney, Agent, or Firm* — McDermott Will & Emery LLP

(57) ABSTRACT

The present invention provides a radio frequency identification electronic tag with diversion-proof function and a process for making the same. The radio frequency identification electronic tag with diversion-proof function is formed of a supporting layer, a release liner, an antenna and a chip, wherein the release liner is bonded to one side of the supporting layer to form an entity, the antenna is bonded to the other side of the release liner, or, the antenna is bonded to the two sides of the entity formed by the supporting layer and the release liner, and is connected via overbridge points on the antenna, the overbridge points run through the supporting layer and the release liner so that antennas at the two sides are switched into conduction; the chip is bonded to the antenna. Once the RFID tag with diversion-proof function is peeled off or transferred, its physical structure will be destroyed and the information contained therein cannot be read, achieving the object of incapable of being reused. At the same time, the thermosetting resins are bonded organically according to the processing technology of the RFID tag, then the bonding points and the overbridge points of the chip have higher bonding fastness with the supporting layer, it is not easy for the chip to peel off with the release liner and better overbridge effect is achieved, which can greatly improve the yield of the finished RFID tag with diversion-proof function.

7 Claims, 1 Drawing Sheet

RADIO FREQUENCY IDENTIFICATION TAG HAVING DIVERSION-PROOF FUNCTION AND MANUFACTURING METHOD THEREOF

TECHNICAL FIELD

The present invention relates to a radio frequency identification electronic tag and a process for making the same.

BACKGROUND ART

The radio frequency identification (abbreviated as RFID) technology can be used for automatically identifying target objects and obtaining relevant data by means of radio-frequency signals without human intervention during the identification process, can be applied to various environments, and can identify a plurality of tags at the same, with the operations thereof being quick and convenient. After 2004, the RFID technology develops vigorously and exhibits broad utilization potentiality in the fields of warehouse logistics, product anti-forgery, product circulation, product maintenance and tracing and the like. In the application of product anti-forgery, RFID is known as the new generation of "electric Defensor" due to its features of safety, high efficiency, rapidness, high storage capacity, easy alteration of stored information and the like.

At the same time, as the chip in the radio frequency identification technology has a globally unique UID code, stores information stably, can only be counterfeited at a high cost, can store mass information and allows simple reading-writing, the radio frequency identification technology is able to help consumers to conveniently identify products' identities via a dedicated identifying device provided by merchants and can be used for achieving complete course tracking throughout product circulation.

Currently, commercially available RFID tags are usually produced by using paper or polyester films as substrates. Especially, the RFID tags of the aluminum etching type are broadly used at present. In view of limitations by the aluminum etching and the chip-bonding process, the resulting RFID tags are closely bonded with the substrate, which provides good stability in processing and using, but also limits the applications thereof in the field of product circulation, especially in the field of product anti-forgery. Lawbreakers can integrally peel off a RFID tag from a genuine product by certain physical-chemical means without destroying its physical structure, and paste the tag which is still readable to a fake product. Such a fake product can hardly be distinguished from the genuine product, and thus, the RFID tag fails to serve for anti-forgery and logistics management.

SUMMARY OF INVENTION

The object of the present invention is to provide a radio frequency identification tag with diversion-proof function and a process for making the same, so as to eliminate the above-mentioned defects in the prior art.

The radio frequency identification tag with diversion-proof function according to the present invention is formed of a supporting layer, a release liner, an antenna and a chip; wherein the release liner is bonded to one side of the supporting layer to form an entity, the antenna is bonded to the other side of the release liner, or, the antenna is bonded to the two sides of the entity formed by the supporting layer and the release liner, and is connected with each other via overbridge points on the antenna, the overbridge points run through the supporting layer and the release liner so that antennas at the two sides are switched into conduction;

the chip is bonded to the antenna;

the antenna is selected from high frequency antenna, ultra-high frequency antenna or low frequency antenna;

when high frequency antenna is used, the antenna is bonded to the two sides of the entity formed by the supporting layer and the release liner, and is connected with each other via overbridge points on the antenna;

the antenna can be aluminum etched antenna, copper etched antenna, conductive silver paste printed antenna, conductive polymer printed antenna, electroless copper plating antenna, vacuum copper plating antenna, vacuum aluminum plating antenna or the like, which can be prepared by processes reported in literatures such as *The Research on Parameters of Screen Printing Process for Intelligent Tag Antennas, The Technology of Conductive Ink and Printing Antenna for Electronic Tag RFID, Three Processes for Preparing RFID Antennas, Production of RFID Antennas by Gravure Etching Processes, The Principles, Applications and Expectations for Electroless Copper Plating, An Introduction to Vacuum Aluminum Plating* and the like;

the conductive thermosetting resin is, for example, XH9850 from Japanese NAMICS corporation, 6998 from UNINWELL corporation, or TB3373C from THREEBOND corporation or the like, or other conventional conductive thermosetting resins, with no special requirements;

the material of the supporting layer (1) is selected from a polyester material or paper, wherein the polyester material can be PET (polyethylene terephthalate), PP (polypropylene), PVC (polyvinyl chloride), PE (polyethylene) or PC (polycarbonate) etc.;

the release liner comprises the following components in percentage by weight:

| | |
|---|---|
| photo-curable resin | 5~90% |
| photoinitiator | 1~5% |
| bonding resin | 4~89% |
| thermosetting resin | 5~90% | wherein the sum of percentages of each components is 100%.

Preferably, the release liner has the following composition in percentage by weight:

| | |
|---|---|
| photo-curable resin | 25~55% |
| photoinitiator | 1~3% |
| bonding resin | 29~59% |
| thermosetting resin | 15~45% | wherein the sum of percentages of each components is 100%.

The photo-curable resin is photo-curable acrylic resin, photo-curable polyurethane or the like, wherein, DY5300 and DY6200 from Sunny Chemicals, UV1201 and UV1205 from Yantai Ruihua Chemicals, TB8522B from Guangdong Tongbu Chemicals and the like can be used;

the photoinitiator is selected from benzophenone, 1173 (2-hydroxy-2-methyl-1-phenyl acetone), AIBN (azodiisobutyronitrile), BPO (benzoperoxide) or benzophenone etc.;

the bonding resin is selected from EVA (ethylene-vinyl acetate copolymer), PS (polystyrene), PMMA (polymethyl methacrylate), PC (polycarbonate), PVC (polyvinyl chloride), PE (polyethylene), acrylic resin or epoxy resin etc.;

the thermosetting resin is selected from thermosetting phenolic resin, thermosetting urea-formaldehyde resin, melamine-formaldehyde resin, thermosetting epoxy resin, thermosetting unsaturated resin, thermosetting polyurethane, polyimide etc.;

the process for making the RFID electronic tag with diversion-proof function according to the present invention comprises the following steps:

(1) adding each components of the release liner into a solvent and mixing to produce a mixture which is then coated on the supporting layer, dried at 80~100° C. for 1~5 minutes, optimally with infrared heating, and then photo-cured for 3~30 seconds under ultraviolet light, wherein the release liner has lower fastness with the supporting layer, can be easily peeled off and exhibits friability;

depending on the selected types, the thermosetting resin in the components of the release liner has a curing temperature of 120~180° C., and upon curing of the thermosetting resin, the area of the release liner which is cured by heat will generate higher bonding fastness with the supporting layer;

the solvent is selected from ethyl acetate, butyl acetate, isopropanol, butanone, toluene, xylol, n-butyl alcohol, ethanol or the like, and each components of the release liner (2) have solid content of 15~45% by mass in total;

(2) directly printing a conductive silver paste or conductive polymer material onto the surface of the release liner of the product from step (1) to form a printed antenna, wherein screen printing, gravure printing, flexography printing, offset printing or the like can be used;

the conductive polymer such as polyacetylene, polythiophene, polyaniline, polyphenylene vinylene, polyphenylene or the like, and the process such as screen printing, gravure printing, flexography printing, offset printing or the like, are detailedly reported in relevant manuals or literatures, such as *The Research on Parameters of Screen Printing Process for Intelligent Tag Antennas, The Technology of Conductive Ink and Printing Antenna for Electronic Tag RFID*, etc., which are not described repeatedly herein;

or:

using an adhesive to combine the release liner described above with an aluminum foil or copper foil, onto which antenna patterns are printed and the etched antenna can be formed after etching via acid liquor or alkali liquor and deinking processing; wherein the printing process which can be adopted is screen printing, gravure printing, flexography printing, offset printing or the like; specifically, see the processes reported in literatures such as *Three Processes for Preparing RFID Antennas, Production of RFID Antennas by Gravure Etching Processes*, etc.;

or:

firstly printing a conductive material on the release liner described above as a seed layer, then depositing copper on the seed layer via chemical deposition to obtain electroless copper plating antenna;

wherein the conductive material is selected from RL1206 from Resink Corporation, E-820B or EO-427SS from ACHESON Corporation etc.;

or:

directly carrying out vacuum copper plating or vacuum aluminum plating with a mold plate on the release liner described above to form a vacuum copper plating antenna or vacuum aluminum plating antenna; wherein the process for vacuum copper plating or vacuum aluminum plating can be found in the literatures such as *The Principles, Applications and Expectations for Electroless Copper Plating, An Introduction to Vacuum Aluminum Plating* and the like.

With regard to the preparation of high frequency antenna, it is further necessary to prepare part of the antenna on the other side of the supporting layer (1) with the same process during the preparation described above.

(3) bonding the chip to the antenna as formed above with a thermosetting conductive adhesive, which is subjected to hot-pressing for curing, with the hot-pressing temperature being 120~180° C. and the curing time being 5~10 seconds; and using a RFID reader-writer matched with the chip to input data, so as to obtain the RFID electronic tag with diversion-proof function.

With regard to high frequency RFID electronic tags, it is further necessary to switch into conduction the antennas positioned on both sides of the supporting layer via overbridge points using an overbridge process selected from hot-pressing breakdown switching-into-conduction with a hot-pressing temperature of 120~180° C. or ultrasonic breakdown switching-into-conduction, then to bond the chip to the antenna through a thermosetting conductive adhesive, which is then subjected to hot-pressing for curing at a temperature of 120~180° C. for 5~10 seconds; a RFID reader-writer matched with the chip is used to input data, so as to obtain the RFID electronic tag with diversion-proof function.

The materials of the release liner according to the present invention contain thermosetting resins, the high temperature for bonding the chip and the antenna will cure the thermosetting components in the materials of the release liner at the bonding points to generate higher bonding fastness with the supporting layer, and thus, looseness or rupture of the chip bonding points in a RFID tag can be avoided during its subsequent processing procedures, customer use and the like, the decrease in RFID tag performance and the probability of failure thereof are reduced, and eventually, the yield of the finished RFID tag product is improved.

Similarly, with regard to high frequency RFID tags requiring the overbridge process, antenna is present on the front side and the reverse side, i.e. both sides of the supporting layer and a bridge is required (i.e. to switch into conduction by puncturing through the supporting layer). Due to the presence of the release liner, looseness or rupture can easily take place in the overbridge points besides the bonding points of the chip, which affects the overbridge (switching-into-conduction) effect and then causes decrease in performance or damage of the high frequency RFID tag, resulting in higher rejection rate of the product. Therefore, the usage of the high temperature hot-pressing or ultrasonic switching-into-conduction process according to the present invention facilitates the curing reaction of the thermosetting resins in the materials of the release liner in the overbridge points, so as to provide high bonding strength with the supporting layer, effectively enhance the fastness at the overbridge points and achieve the object of improving the yield of the finished high frequency RFID tag product.

Upon use of the tag according to the present invention, a bonder is coated on the reverse side of the tag containing the release liner, then the tag is pasted to the surface of a product or the surface of the external packing of the product, which can be used after 24 hours. When the RFID tag is to be peeled off, the chip of the RFID, the overbridge points of the antenna and part of the antenna are bonded to the supporting layer and the other part of the antenna is bonded to surface of the product when the release liner breaks. The RFID tag will lose its read-write function with the breakage of the antenna, so as to achieve the effect of safety and anti-forgery.

By incorporating special types of polymer materials into conventional process for making RFID tags and then adopting special processes and means, the present invention produces RFID tag with diversion-proof function that can only be used once. In other words, the RFID tag with diversion-proof function cannot be peeled off or transferred after it is pasted to a product, once the RFID tag with diversion-proof function is peeled off or transferred, its physical structure will be destroyed and the information contained therein can not be read, achieving the object of incapable of being reused. At the same time, the thermosetting resins are bonded organically according to the processing technology of the RFID tag, then the bonding points and the overbridge points of the chip have higher bonding fastness with the supporting layer, it is not easy for the chip to peel off with the release liner and better overbridge effect is achieved, which can greatly improve the yield of the finished RFID tag with diversion-proof function.

SPECIFIC MODE OF CARRYING OUT THE INVENTION

Figure 1:
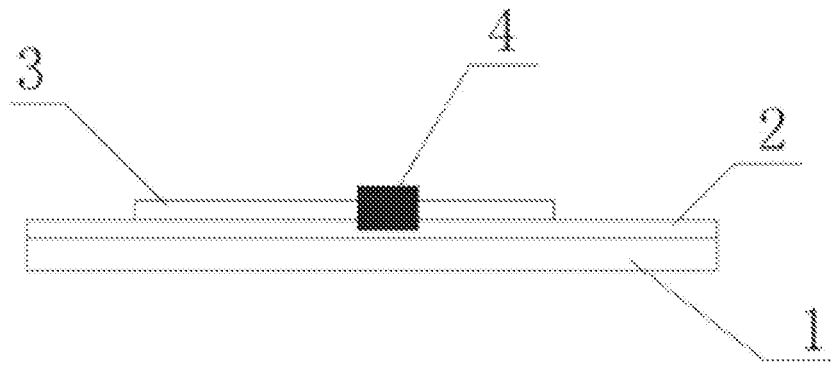
FIG. 1 is a structural diagram of the RFID electronic tag with diversion-proof function.
Figure 2:
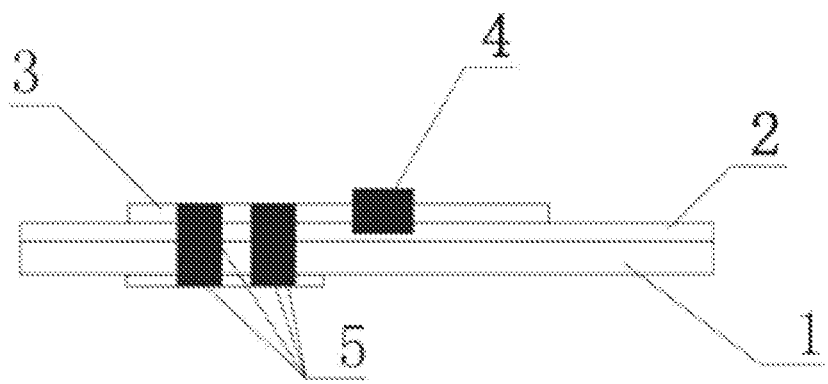
FIG. 2 is a structural diagram of the high frequency RFID electronic tag with diversion-proof function.
Figure 3:
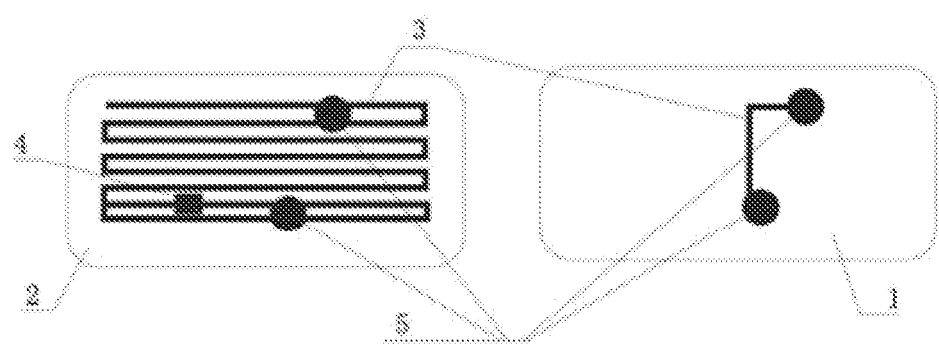
FIG. 3 is a top view diagram of the front side and the reverse side of the high frequency RFID electronic tag with diversion-proof function.

With reference to FIGS. 1 to 3, the radio frequency identification tag with diversion-proof function according to the present invention is formed of a supporting layer 1, a release liner 2, an antenna 3 and a chip 4; wherein the release liner 2 is bonded to one side of the supporting layer 1 to form an entity, the antenna 3 is bonded to the other side of the release liner 2, or, the antenna 3 is bonded to the two sides of the entity formed by the supporting layer 1 and the release liner 2, and is connected with each other via overbridge points 5 thereon, the overbridge points 5 run through the supporting layer 1 and the release liner 2 so that antennas 3 at the two sides are switched into conduction;

the chip 4 is bonded to the antenna 3, preferably, the chip 4 is bonded to the antenna 3 by means of conductive thermosetting resins;

the antenna 3 is selected from high frequency antenna, ultrahigh frequency antenna or low frequency antenna;

when high frequency antenna is used, the antenna 3 is bonded to the two sides of the entity formed by the supporting layer 1 and the release liner 2, and is connected with each other via overbridge points 5 thereon.

Example 1

PET film is used as the material of the supporting layer, each components of the release liner are added to the solvent ethyl acetate, mixed, and then are coated on the supporting layer by using a coater;

the material of the release liner has the following composition in percentage by weight:

| | |
|---|---|
| photo-curable acrylic resin | 25% |
| BPO (benzoperoxide) | 1% |
| PMMA (polymethyl methacrylate) | 49% |
| thermosetting phenolic resin | 25% | each components of the release liner have solid content of 25% by mass in total;

the photo-curable acrylic resin is DY5300 from Sunny Chemicals;

an infrared drying tunnel is used for drying at 100° C. for 5 minutes, then an ultraviolet curing equipment with power of 5 kilowatt is used for curing for 10 seconds, the coating has a thickness of 20 micrometers;

the release liner is printed with conductive silver paste by screen printing of 400 meshes and dried at 100° C. to form the RFID antenna, the chip of the RFID is bonded by thermosetting conductive adhesive, which is subjected to hot-pressing for curing, with the hot-pressing temperature being 160° C. and the hot-pressing time being 8 seconds;

a RFID reader-writer matched with the chip is used to input data, so as to obtain the product.

TB3373C from THREEBOND Corporation is selected and used as the thermosetting conductive adhesive.

Example 2

PET film is used as the material of the supporting layer, each components of the release liner are added to the solvent ethyl acetate, mixed, and then are coated on the supporting layer by using a coater;

the material of the release liner has the following composition in percentage by weight:

| | |
|---|---|
| photo-curable polyurethane | 40% |
| 1173 (2-hydroxy-2-methyl-1-phenyl acetone) | 3% |
| EVA (ethylene-vinyl acetate copolymer) | 27% |
| thermosetting urea-formaldehyde resin | 30% | each components of the release liner have solid content of 35% in total;

the photo-curable polyurethane is DY6200 from Sunny Chemicals;

an infrared drying tunnel is used for drying at 100° C. for 3 minutes, then an ultraviolet curing equipment with power of 10 kilowatt is used for curing for 5 seconds, the coating has a thickness of 20 micrometers;

then aluminum foil with a thickness of 16 micrometers is combined with the above described release liner through an adhesive, then antenna patterns are printed on the aluminum foil in gravure printing manner, after etching via acid liquor or alkali liquor and deinking processing, the etched antenna is formed; then the chip of the RFID is bonded by thermosetting conductive adhesive, which is subjected to hot-pressing for curing, with the hot-pressing temperature being 160° C. and the curing time being 10 seconds;

a RFID reader-writer matched with the chip is used to input data, so as to obtain the product.

TB3373C from THREEBOND Corporation is selected and used as the thermosetting conductive adhesive.

Example 3

PET film is used as the material of the supporting layer, each components of the release liner are added to the solvent xylol, mixed, and then are coated on the supporting layer using a coater;

the material of the release liner has the following composition in percentage by weight:

| | |
|---|---|
| photo-curable acrylic resin | 30% |
| AIBN (azodiisobutyronitrile) | 2% |
| EVA (ethylene-vinyl acetate copolymer) | 48% |
| Polyimide | 20% | each components of the release liner have solid content of 30% in total;

the photo-curable acrylic resin is UV1201 from Yantai Ruihua Chemicals;

an infrared drying tunnel is used for drying at 90° C. for 5 minutes, then an ultraviolet curing equipment with power of 10 kilowatt is used for curing for 15 seconds, the coating has a thickness of 30 micrometers;

the release liner is firstly printed with conductive silver paste by screen printing of 500 meshes as a seed layer and dried at 100° C., and then copper is deposited on the seed layer by chemical deposition, so as to form the electroless copper plating antenna; then the chip of the RFID is bonded by thermosetting conductive adhesive, which is subjected to hot-pressing for curing, with the hot-pressing temperature being 140° C. and the curing time being 10 seconds;

a RFID reader-writer matched with the chip is used to input data, so as to obtain the product.

XH9850 from NAMICS Corporation is selected and used as the thermosetting conductive adhesive.

Example 4

PET film is used as the material of the supporting layer, each components of the release liner are added to the solvent ethyl acetate, mixed, and then are coated on the supporting layer by using a coater;

the material of the release liner has the following composition in percentage by weight:

| | |
|---|---|
| photo-curable polyurethane: | 55% |
| benzophenone | 3% |
| PS (polystyrene) | 12% |
| thermosetting epoxy resin | 30% | each components of the release liner have solid content of 20% in total;

the photo-curable acrylic resin is TB8522B from Guangdong Tongbu Chemicals;

an infrared drying tunnel is used for drying at 100° C. for 5 minutes, then an ultraviolet curing equipment with power of 10 kilowatt is used for curing for 5 seconds, the coating has a thickness of 20 micrometers;

vacuum aluminum plating is carried out directly with a mold plate on the release liner described above to form a vacuum aluminum plating antenna; then the chip of the RFID is bonded by thermosetting conductive adhesive, which is subjected to hot-pressing for curing, with the hot-pressing temperature being 180° C. and the curing time being 6 seconds;

a RFID reader-writer matched with the chip is used to input data, so as to obtain the product.

XH9850 from NAMICS Corporation is selected and used as the thermosetting conductive adhesive.

Example 5

PET film is used as the material of the supporting layer, each components of the release liner are added to the solvent butyl acetate, mixed, and then are coated on the supporting layer by using a coater;

the material of the release liner has the following composition in percentage by weight:

| | |
|---|---|
| photo-curable polyurethane | 32% |
| 1173 (2-hydroxy-2-methyl-1-phenyl acetone) | 3% |
| EVA (ethylene-vinyl acetate copolymer) | 25% |
| thermosetting unsaturated resin | 40% | each components of the release liner have solid content of 35% in total;

the photo-curable polyurethane is DY6200 from Sunny Chemicals;

an infrared drying tunnel is used for drying at 100° C. for 4 minutes, then an ultraviolet curing equipment with power of 10 kilowatt is used for curing for 5 seconds, the coating has a thickness of 20 micrometers;

then aluminum foil with a thickness of 16 micrometers is combined with the above described release liner through an adhesive, at the same time aluminum foil with a thickness of 9 micrometers is also combined on the other side of the supporting layer, then antenna patterns are printed on the aluminum foil on both sides in gravure printing manner, after etching via acid liquor or alkali liquor and deinking processing, the etched antenna is formed, the antenna on both sides of the supporting layer is switched in conduction at the overbridge points by the hot-pressing breakdown switching-into-conduction process at a temperature of 120° C.; then the chip of the RFID is bonded by thermosetting conductive adhesive, which is subjected to hot-pressing for curing, with the hot-pressing temperature being 160° C. and the curing time being 10 seconds;

a RFID reader-writer matched with the chip is used to input data, so as to obtain the product.

XH9850 from NAMICS Corporation is selected and used as the thermosetting conductive adhesive.

Example 6

PET film is used as the material of the supporting layer, each components of the release liner are added to the solvent toluene, mixed, and then are coated on the supporting layer by using a coater;

the material of the release liner has the following composition in percentage by weight:

| | |
|---|---|
| photo-curable polyurethane | 35% |
| 1173 (2-hydroxy-2-methyl-1-phenyl acetone) | 3% |
| EVA (ethylene-vinyl acetate copolymer) | 27% |
| thermosetting polyurethane | 35% | each components of the release liner have solid content of 35% in total;

the photo-curable polyurethane is DY6200 from Sunny Chemicals;

an infrared drying tunnel is used for drying at 100° C. for 4 minutes, then an ultraviolet curing equipment with power of 20 kilowatt is used for curing for 3 seconds, the coating has a thickness of 30 micrometers;

then aluminum foil with a thickness of 30 micrometers is combined with the above described release liner through an adhesive, at the same time aluminum foil with a thickness of 9 micrometers is also combined on the other side of the supporting layer, then antenna patterns are printed on the aluminum foil on both sides in gravure printing manner, after etching via acid liquor or alkali liquor and deinking processing, the etched antenna is formed, the antenna on both sides of the supporting layer is switched into conduction at the overbridge points by the ultrasonic switching-into-conduction process; then the chip of the RFID is bonded by thermosetting conductive adhesive, which is subjected to hot-pressing for curing, with the hot-pressing temperature being 160° C. and the curing time being 10 seconds;

a RFID reader-writer matched with the chip is used to input data, so as to obtain the product.

TB3373C from THREEBOND Corporation is selected and used as the thermosetting conductive adhesive.

Example 7

Coated paper with gram weight of 80 is used as the material of the supporting layer, each components of the release liner are added to the solvent ethyl acetate, mixed, and then are coated on the supporting layer by using a coater;

the material of the release liner has the following composition in percentage by weight:

| | |
|---|---|
| photo-curable acrylic resin | 25% |
| BPO (benzoperoxide) | 1% |
| PMMA (polymethyl methacrylate) | 49% |
| melamine-formaldehyde resin | 25% | each components of the release liner have solid content of 25% in total;

the photo-curable acrylic resin is DY5300 from Sunny Chemicals;

an infrared drying tunnel is used for drying at 100° C. for 6 minutes, then an ultraviolet curing equipment with power of 5 kilowatt is used for curing for 10 seconds, the coating has a thickness of 20 micrometers;

the release liner is printed with conductive silver paste by screen printing of 400 meshes and dried to form the RFID antenna, the chip of the RFID is bonded by thermosetting conductive adhesive, which is subjected to hot-pressing for curing, with the hot-pressing temperature being 160° C. and the curing time being 8 seconds;

a RFID reader-writer matched with the chip is used to input data, so as to obtain the product.

6998 from UNINWELL Corporation is selected and used as the thermosetting conductive adhesive.

What is claimed is:

1. A radio frequency identification tag with diversion-proof function, characterized in that the radio frequency identification tag is formed of a supporting layer (1), a release liner (2), an antenna (3) and a chip (4);

wherein the release liner (2) is bonded to one side of the supporting layer (1) to form an entity, the antenna (3) is bonded to the other side of the release liner (2), or, the antenna (3) is bonded to the two sides of the entity formed by the supporting layer (1) and the release liner (2), and is connected with each other via overbridge points (5) thereon, the overbridge points (5) run through the supporting layer (1) and the release liner (2) so that antennas (3) at the two sides are switched into conduction; and the chip (4) is bonded to the antenna (3), wherein a physical structure of the radio frequency identification tag is configured to be destroyed once the radio frequency identification tag is peeled off or transferred.

2. The radio frequency identification tag with diversion-proof function according to claim 1, characterized in that the chip (4) is bonded to the antenna (3) by means of a conductive thermosetting resin.

3. The radio frequency identification tag with diversion-proof function according to claim 1, characterized in that the antenna (3) is selected from high frequency antenna, ultra-high frequency antenna or low frequency antenna.

4. The radio frequency identification tag with diversion-proof function according to claim 1, characterized in that the antenna (3) is selected from aluminum etched antenna, copper etched antenna, conductive silver paste printed antenna, conductive polymer printed antenna, electroless copper plating antenna, vacuum copper plating antenna or vacuum aluminum plating antenna.

5. The radio frequency identification tag with diversion-proof function according to any one of claims 1 to 4, characterized in that the material of the supporting layer (1) is selected from a polyester material or paper, wherein the polyester material can be polyethylene terephthalate, polypropylene, polyvinyl chloride, polyethylene or polycarbonate;

the release liner (2) comprises the following components in percentage by weight:

| | |
|---|---|
| photo-curable resin | 5~90% |
| photoinitiator | 1~5% |
| bonding resin | 4~89% |
| thermosetting resin | 5~90% | wherein the sum of percentages of each components is 100%.

6. The radio frequency identification tag with diversion-proof function according to claim 5, characterized in that the release liner (2) has the following composition in percentage by weight:

| | |
|---|---|
| photo-curable resin | 25~55% |
| photoinitiator | 1~3% |
| bonding resin | 29~59% |
| thermosetting resin | 15~45% | wherein the sum of percentages of each components is 100%;

the photoinitiator is selected from benzophenone, 1173 (2-hydroxy-2-methyl-1-phenyl acetone), AIBN (azodi-isobutyronitrile), BPO (benzoperoxide) or benzophenone;

the bonding resin is selected from ethylene-vinyl acetate copolymer, polystyrene, polymethyl methacrylate, polycarbonate, polyvinyl chloride, polyethylene, acrylic resin or epoxy resin;

the thermosetting resin is selected from thermosetting phenolic resin, thermosetting urea-formaldehyde resin, melamine-formaldehyde resin, thermosetting epoxy resin, thermosetting unsaturated resin, thermosetting polyurethane or polyimide.

7. A process for making the radio frequency identification tag with diversion-proof function according to any one of claims 1 to 6, characterized in that the process comprises the following steps:

(1) adding each components of the release liner (2) into a solvent and mixing to produce a mixture which is then coated on the supporting layer (1), dried at 8~100° C. for 1~5 minutes, optimally with infrared heating, and then photo-cured for 3~30 seconds under ultraviolet light with a curing temperature of 12~180° C.;

wherein the solvent is selected from ethyl acetate, butyl acetate, isopropanol, butanone, toluene, xylol, n-butyl alcohol, ethanol or the like, and each components of the release liner (2) have solid content of 15~45% by mass in total;

(2) directly printing a conductive silver paste or conductive polymer material onto the surface of the release liner of the product from step (1) to form a printed antenna;

or:

using an adhesive to combine the release liner (2) described above with an aluminum foil or copper foil, onto which antenna patterns are printed and an etched antenna can be formed after etching via acid liquor or alkali liquor and deinking processing;

or:

firstly printing a conductive material on the release liner (2) described above as a seed layer, then depositing copper on the seed layer via chemical deposition to obtain an electroless copper plating antenna;

or:

directly carrying out vacuum copper plating or vacuum aluminum plating with a mold plate on the release liner (2) described above to form a vacuum copper plating antenna or vacuum aluminum plating antenna;

(3) bonding the chip to the antenna as formed above with a thermosetting conductive adhesive, which is subjected to hot-pressing for curing, with the hot-pressing temperature being 12~180° C. and the curing time being 5~10 seconds; and using a RFID reader-writer matched with the chip to input data, so as to obtain the RFID electronic tag with diversion-proof function.

* * * * *